(12) United States Patent
Halford

(10) Patent No.: US 9,370,877 B2
(45) Date of Patent: Jun. 21, 2016

(54) CONTROL SYSTEM FOR TOOLING

(75) Inventor: Ben Halford, Oakham (GB)

(73) Assignee: SURFACE GENERATION LIMITED, Rutland (GB)

( * ) Notice: Subject to any disclaimer, the term of this patent is extended or adjusted under 35 U.S.C. 154(b) by 1098 days.

(21) Appl. No.: 13/502,096

(22) PCT Filed: Oct. 20, 2010

(86) PCT No.: PCT/GB2010/001952
§ 371 (c)(1),
(2), (4) Date: Jul. 24, 2012

(87) PCT Pub. No.: WO2011/048376
PCT Pub. Date: Apr. 28, 2011

(65) Prior Publication Data
US 2012/0280415 A1    Nov. 8, 2012

(30) Foreign Application Priority Data

Oct. 20, 2009 (GB) .................................. 0918362.5

(51) Int. Cl.
*B29C 33/02* (2006.01)
*B29C 35/02* (2006.01)
(Continued)

(52) U.S. Cl.
CPC ............. *B29C 35/0288* (2013.01); *B29C 33/02* (2013.01); *B29C 33/046* (2013.01);
(Continued)

(58) Field of Classification Search
USPC ....................................................... 264/40.1
See application file for complete search history.

(56) References Cited

U.S. PATENT DOCUMENTS

| 3,763,293 A | 10/1973 | Nussbaum |
| 4,496,697 A | 1/1985 | Zsolnay |

(Continued)

FOREIGN PATENT DOCUMENTS

| DE | 19854057 A1 | 11/1998 |
| GB | 1234367 A | 9/1969 |

(Continued)

OTHER PUBLICATIONS

GB Patent Office Search Report of Mar. 4, 2010 in Application No. GB0918362.5.

(Continued)

*Primary Examiner* — Yogendra Gupta
*Assistant Examiner* — Kimberly A Stewart
(74) *Attorney, Agent, or Firm* — Young Law Firm, P.C.

(57) ABSTRACT

A tooling system for moulding a work piece is provided The tooling system comprises a mould tool (4) having a tool surface divided into a plurality of individual temperature controlled tool zones (6), and a control system for controlling the temperature of the plurality of individual zones of a tool surface, the control system comprising, a memory means (14) for storing desired curing parameters for the work piece, a plurality of sensors (12) associated with the individual tool zones (6) that sense and output a signal indicative of a property of the work piece or the tool surface in each tool zone (6), a main processor (16) and a controller (18) The main processor (16) is programmed to monitor said output signals so as to monitor said property of the work piece or tool surface and to read the desired curing parameters from the memory means (14) The controller ('8) is programmed to receive said signals and to receive information relating to said desired curing parameters of each tool zone (6) and, based on the information received, to calculate and output a control solution to control a supply of heat to each individual tool zones (6) so as to heat or cool them The main processor (14) is programmed to compare the signals of the monitored property to the desired curing parameters, to identify trends in said monitored property and, if said trends indicate that the monitored property of a tool zone (6) will move out of a tolerance band of the desired curing parameters, to modify or distort the desired curing parameters read from the memory means (14) and to request a further control solution to obtain said modified or distorted curing parameters so as to maintain the monitored property within said desired tolerance band of the desired curing parameters.

15 Claims, 5 Drawing Sheets

(51) Int. Cl.
*B29C 33/04* (2006.01)
*B29C 35/00* (2006.01)
*B29C 37/00* (2006.01)

(52) U.S. Cl.
CPC .......... *B29C 35/007* (2013.01); *B29C 35/0294* (2013.01); *B29C 2037/90* (2013.01); *B29C 2037/903* (2013.01); *B29C 2037/906* (2013.01)

(56) References Cited

U.S. PATENT DOCUMENTS

| | | | |
|---|---|---|---|
| 4,721,589 A | 1/1988 | Harris | |
| 5,345,397 A | 9/1994 | Handel | |
| 5,738,345 A | 4/1998 | Schroeder et al. | |
| 6,089,061 A | 7/2000 | Haas et al. | |
| 6,468,064 B1* | 10/2002 | Kamiguti et al. | 425/145 |
| 2003/0030166 A1 | 2/2003 | Eiva | |
| 2003/0154004 A1* | 8/2003 | Kroeger et al. | 700/272 |
| 2003/0227107 A1* | 12/2003 | Stewart | 264/236 |
| 2006/0082009 A1* | 4/2006 | Quail et al. | 264/40.1 |
| 2007/0023969 A1* | 2/2007 | Biederman et al. | 264/408 |
| 2008/0084002 A1 | 4/2008 | Raben | |
| 2009/0011063 A1* | 1/2009 | Davie et al. | 425/144 |

FOREIGN PATENT DOCUMENTS

| | | |
|---|---|---|
| WO | 96/35563 A1 | 5/1996 |
| WO | 96/22181 A1 | 7/1996 |
| WO | 2005/049298 A1 | 11/2004 |
| WO | 2006/067447 A1 | 12/2005 |

OTHER PUBLICATIONS

International Search Report and Written Opinion of Feb. 18, 2011 in PCT/GB2010/001952.

* cited by examiner

CONTROL SYSTEM FOR TOOLING

BACKGROUND

This invention relates to mould tools, in particular to mould tools for moulding parts to a desired specification.

Moulding is a well known process that involves shaping a material when in a flowable or semi flowable form. There are many factors that effect the properties on a moulded part, for example the orientation of any filler therein and the degree of crystallinity and/or cross linking of polymer molecules (when moulding plastics). In many cases, providing a certain degree of strength is required then any actual variance between parts is overlooked providing they all fall within a rough tolerance band.

With the movement of polymer parts into more critical industries it is becoming ever increasingly important to be certain that a moulded part has the desired properties. For example it is critical that large polymer panels used in fuselage sections of aircraft have the desired structural strength and impact resistance.

Currently such safety critical parts are manufactured in autoclaves which are essentially large ovens which have a very closely controlled temperature. The parts are then processed through a moulding process in which the temperature of the mould is closely controlled. One drawback of this approach is the thermal mass of autoclaves as the entire moulds are normally placed within them. This means that, for the temperature to be controlled any changes in temperature can only occur very slowly. This eliminates the possibility of for example crash cooling a moulded part once the required crystallinity has been reached.

A further problem with the autoclave approach is that as the whole mould is located in the autoclave it is very difficult to control the heat input into different areas of a work piece being moulded at different rates. To this end the design of parts is largely a black art that often involves many design iterations and moulding parameter iterations before repeatable parts are produced to specification.

SUMMARY

It is the purpose of the present invention to provide an improved moulding process and apparatus.

According to a first aspect of the invention there is provided a tooling system for moulding a work piece, comprising a mould tool having a mould surface divided into a plurality of individual temperature controlled tool zones, and a control system for controlling the temperature of the plurality of individual tool zones; the control system comprising:

a memory means for storing desired curing parameters for the work piece;

a plurality of sensors associated with the individual tool zones that sense and output signals indicative of a property of the work piece or the tool surface in each tool zone;

a main processor programmed to: monitor said output signals so as to monitor said property of the work piece or tool surface, to read said desired curing parameters from the memory means and to request a control solution to be calculated to obtain said desired curing parameters;

a controller programmed to: receive said signals, receive information relating to said desired curing parameters of each tool zone; receive a request to calculate a control solution to obtain said desired curing parameters; and, based on the information received, to calculate and output a control solution to control a supply of heat to the individual tool zones so as to heat or cool them;

wherein said main processor is programmed to compare the signals of the monitored property to the desired curing parameters, to identify trends in said monitored properties and, if said trends indicate that the monitored property of a tool zone will move out of a tolerance band of the desired curing parameters, to modify or distort the desired curing parameters read from the memory means and to request a further control solution to obtain said modified or distorted curing parameters so as to maintain the monitored property within said desired tolerance band of the desired curing parameters.

The main processor has in its associated memory the desired curing parameters. These can be, for example, time and temperature set points and/or temperature ramp rates for the tool surface or work piece in each zone, or could be more direct measures of the work piece properties, for example the curing parameters could be dielectric values against time which are directly correlated to the degree of cross linking or crystallinity of the material.

Irrespective of any set point values, the desired curing parameters give a desired curing profile for each tool zones which, if followed will produce parts with specific desired properties in specific desired locations. This enables the part to have, for example, deliberately different properties at different areas, of could for example have the same properties throughout, irrespective of changes in work piece thickness. The desired curing parameters will preferably contain a tolerance band applied to the values but the tolerance band could also be an inherent feature of the main processor or could be manually enters or set.

The main processor could be a computer, e.g. a PC and the controller could be a real time controller, for example a PID controller.

The sensors can sense properties of the work piece being moulded or of the tool. The sensors will preferably sense the same properties that are the desired properties, but could equally be properties indicative of the desired curing parameters, for example the sensors could sense one or more of tool body temperature, tool surface temperature, work piece temperature, ultrasonic absorption, dielectric constant of the work piece and internal strain in the work piece. The sensors may form a permanent part of the tool or may be consumable parts embedded within the work piece. The tool zones may each measure different parameters and each tool zone may include one or more types of sensor. In this way it is possible for one parameter to be cross verified against the other, or for example, to control the curing on different parameters at different points in the control process.

The main processor may initiate the control of the heat input into each of the tool zones to bring the tool to a uniform elevated temperature prior to commencement of the control cycle.

The control system monitors the signals received from the sensors and compares these to the desired curing parameters. If the signals from the sensors indicate that the actual work piece or tool parameters are not within a desired tolerance of the desired curing parameter the control system can modify the control of the heat input to the work piece to bring it back in alignment with the desired curing parameters or the tolerance band therefore.

Furthermore, if a measured parameter is within the required tolerance of the desired curing parameter, the main processor can identify if the trend in the measured parameter for a given tool zone is indicative that it is going to, at some time in the future, move out of the desired curing parameter tolerance and, if so, the main processor can modify or distort the desired curing parameters and obtain a new control solution using the modified or distorted desired curing parameters so as to change the heat input to the tool zone in question so as to prevent the measured parameter moving out of the desired tolerance band. In this manner each part can be cured to a particular specification in a repeatable manner.

As the plurality of tool zones are individually heated then the heat is inputted locally to the work piece and limitations of the large thermal mass of mould tools in an autoclave or oven are avoided.

In a preferred arrangement the control system further comprises an electronic billboard that acts as a bridge between the main processor and the controller, said controller and said main processor reading information from and writing information to said billboard to communicate with one another. In this manner the main processor and the controller can easily interact with one another as part of the control system but do not need to be based on the same operating system. For example the main processor could be a computer running a WINTEL system and the controller could be running on the LINUX system and the billboard enables these two systems to function as an integrated control system.

The control system may further comprise an input/output module, associated with said controller, for receiving a plurality of signals from sensors associated with individual tool zones and outputting a plurality of control signals to control a heater associated with each individual tool zone. The control system may also comprise a plurality of solid state relays, said input/output module outputting said control signals to said solid state relays to control said heaters.

In another arrangement of the invention the control system further comprises a dedicated processor, which may run on a WINTEL or LINUX system, having a second memory means associated therewith, wherein the main processor receives the control solution from the controller, and the dedicated processor receives the control solution from the main processor, stores it in the second memory means and, based on said stored control solution, outputs a plurality of control signals to control heaters and/or cooling associated with each of the individual tool zones. In this manner the dedicated processor responsible for the direct control of the heat input is not dependant upon the link between the main and dedicated processors but is capable of running its own control based on stored instructions from the main processor. In this manner, not only do short interruptions in communication between the main and dedicated processors not lead to a breakdown in the control cycle but the dedicated processor can continue to control while the main processor recalculates new control instructions. The main processor can be programmed to receive the control solution from the controller and inspect the solution against predetermined criteria and only pass the solution to the dedicated processor if the predetermined criteria are met.

Effectively in this arrangement the functions of calculating and outputting the control solution and the function of actually controlling the heaters are split between the controller and the dedicated processor where as in the first arrangement they are both carried out by the controller.

The control system may further comprise a network link between the main and the dedicated processor. In this way the main processor can, for example be a PC located in a control room or office of a moulding facility and the dedicated processor can be a local processor located with the mould tool at a separate location.

The control system may further comprises a field programmable gate array (FPGA) associated with said dedicated processor, said FPGA for controlling the heaters dependant upon said control signals. The FPGA can adapt said control signals to perform one of the following functions: heater sequencing, heater pulsing; heater life management and power management. This enables best optimisation and use of the system and enables different control strategies to be adopted to achieve the desired curing parameters. Essentially curing the part to the specification forms the first control driver and the FPGA can dictate a second lower level of control. The controller calculates the primary control solution and the FPGA can adapt this solution to create a secondary control solution which is used to drive the heaters. For example, during hours of high energy cost the second control level managed by the FPGA may optimise the heater usage to minimise energy use, where as at times of low energy cost the FPGA may optimise the heater usage for shortest cycle, times, in both instances ensuring that the curing is kept within the desired curing parameters.

In one embodiment the control system may further comprise an interface for receiving data comprising one or more of: a human interface to enable a user to directly input data into the main processor; an electronic input means for receiving electronic data; a wireless receiver, an universal serial bus interface, an RS232 serial port and a means of reading electronically stored data. By the interface the desired curing parameters and other information, for example properties of the starting material, e.g. the resin temperature going into the mould or the resin dielectric going into the mould, can be inputted into the main processor and the main processor can modify or distort the desired curing parameters to take into consideration batch variations in the starting material.

The tooling system may further comprise a visually sensible output, for example a 2d or 3d representation, for displaying real time data relating to one or more of: the desired curing parameter, the detected property of the work piece or tool face, the tool face temperature, and energy consumption, for a tool zone.

In a preferred embodiment the controller and the main processor electronically may confirm their communication with one another on a periodic basis. Alternatively, or in addition, the main processor and the dedicated processor can electronically confirm their communication with one another on a periodic basis.

In an embodiment wherein the controller (i.e. not the main processor) directly controls the input of heat to the tool elements, if the main processor and the controller are unable to electronically confirm the presence of each other then the controller may continue to control the system according to its calculated control solution and, if the main processor and the controller are unable to electronically confirm the presence of each for a pre determined time period, the control system can initiate a fault sequence in which all tool zones are cooled.

In an embodiment wherein the dedicated processor (i.e. not the controller) directly controls the input of heat to the tool elements, if the main processor and the dedicated processor are unable to electronically confirm the presence of each other the dedicated processor may continue to control the system according to the last stored data saved on the second memory means and if the main processor and the dedicated processor are unable to electronically confirm the presence of each for a pre determined time period, the dedicated processor may initiate a fault sequence from said memory in which all tool zones are cooled.

These control options prevent the system going into an emergency mode if the signals are lost for a short time period but if the signals are lost for a longer time period the system automatically cools the mould tool. As many curing processes are exothermic this ensures the prevention of heat build up to an unacceptable level in the event that changes in the control are effected.

One embodiment the tooling system further comprises a fluid reservoir and a plurality of fluid conduits wherein each fluid conduit is arranged to supply a flow of fluid from said reservoir to a tool zone for heat exchange with the work piece via the tool surface. The tooling system preferably also comprises a heater associated with each fluid conduit and the heaters are arranged to selectively heat the fluid passing therethrough: In this manner when the heaters are on the fluid heats the tool and when the heaters are not on the unheated fluid cools the tool, if previously heated. The heaters may comprise an electrical heater associated with each tool zone.

In one arrangement the controller may comprises a plurality of PID controllers, each PID controller associated with a tool zone.

According to a second aspect of the invention there is provided a method of moulding a work piece to a functional specification the method comprising:
storing desired curing parameters for the work piece on a memory means;
placing the mould material in a mould tool having a mould surface divided into a plurality of individual temperature controlled tool zones;
sensing a property of the work piece or tool surface at each control zone monitoring the signals from the sensors to monitor the sensed property;
comparing the sensed properties to the desired curing parameters;
based on the desired curing parameters calculating a control solution to control the supply of energy to each individual tool zone to meet the desired curing parameters;
controlling the energy input to each tool zone in accordance with the control solution;
identifying trends in said monitored properties; and
if said trends indicate that the monitored property of a tool zone will move out of a tolerance band of the desired curing parameters, modifying or distorting the desired curing parameters read from the memory means and calculating a further control solution to obtain said modified or distorted curing parameters so as to maintain the monitored property within said to desired tolerance band of the desired curing parameters.

Preferably the desired curing parameters may include time and set point information and a tolerance for one or more of tool temperature, work piece temperature or dielectric constant for each individual tool zone. Alternatively, or in addition, the desired curing parameters may include one or more of targets, ramp rates and tolerances for said ramp rate for one or more of tool temperature, work piece temperature or dielectric constant, for each individual tool zone and/or time related differentials for one or more tool temperature, work piece temperature or dielectric constant, between adjacent tool zones.

The method preferably includes using a main processor to monitor the signals from the sensors; compare the monitored properties to the desired curing parameters; and to modify the control solution to maintain the monitored property within the desired tolerance band and using a controller is to calculate the control solution. The method may further include: the controller and the main processor reading information from and writing information to an electronic billboard to communicate with one another such that the electronic billboard acts as an information bridge between the controller and the main processor. The method may also comprise the steps of: comparing the control solution to pre determined criteria and, depending on said comparison, accepting or ignoring said control solution The method may further include writing said control solution from the main processor to a dedicated processor and temporarily storing the control on a second memory means associated with the dedicated processor.

Preferably method further comprises heaters and valves associated with each tool zone and the main processor also sends information of other desired operational parameters to the dedicated processor and the dedicated processor switches the valves and heaters on and off dependant on the control solution and the operational perimeters to heat or cool the tool zones.

The operational parameters may include one or more of power requirement of each heater, switching time of said heater, sequencing of the heaters and, when the heaters are powered buy a multi phase electricity supply, the phase of the supply associated with each heater.

The method further includes: the controller and the dedicated processor electronically confirming the presence of each other on a periodic basis. Preferably if the main processor and the real time controller are unable to electronically confirm the presence of each other the method includes the controller controlling the system according to the data defining desired time and temperature set points for the moulding process and, if the main processor and the controller are unable to electronically confirm the presence of each for a pre determined time period, method includes the control system initiating a fault sequence in which all tool zones are cooled.

BRIEF DESCRIPTION OF THE DRAWINGS

The invention will now be described in more detail, by way of example only, with reference to the drawings in which.

DETAILED DESCRIPTION

Figure 1:
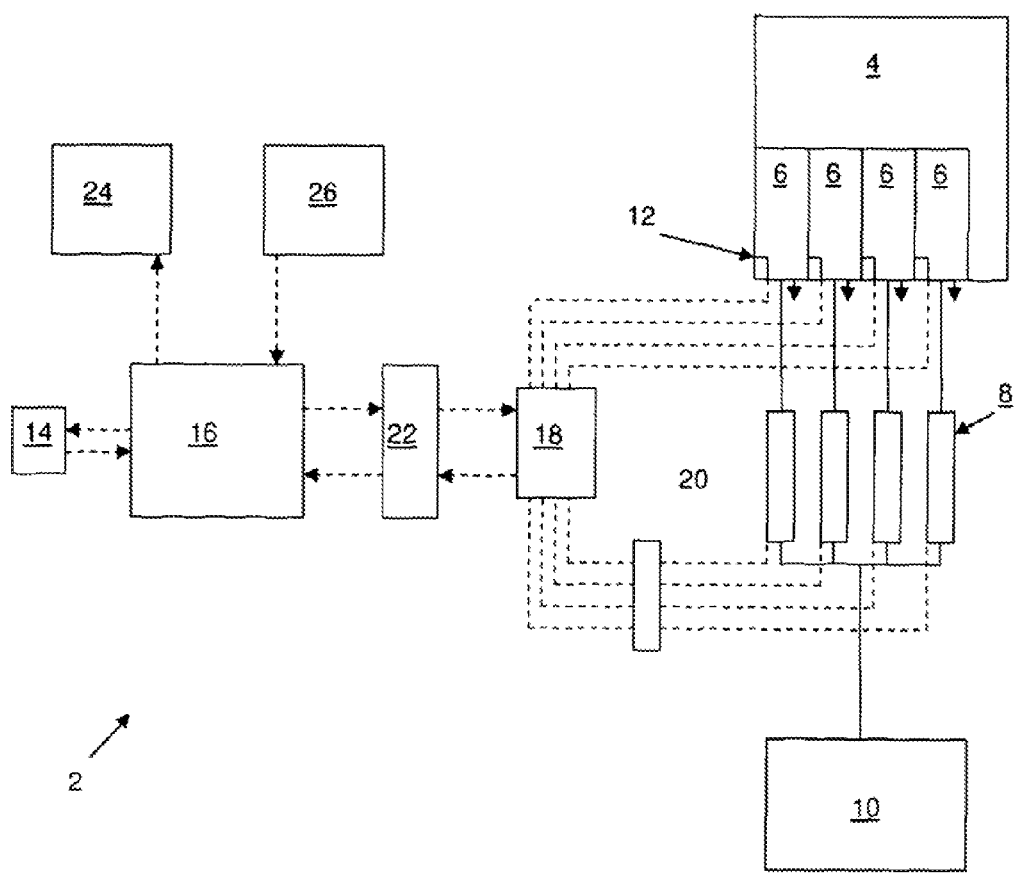
FIG. 1 shows a schematic of a first embodiment of the invention.
Figure 2:
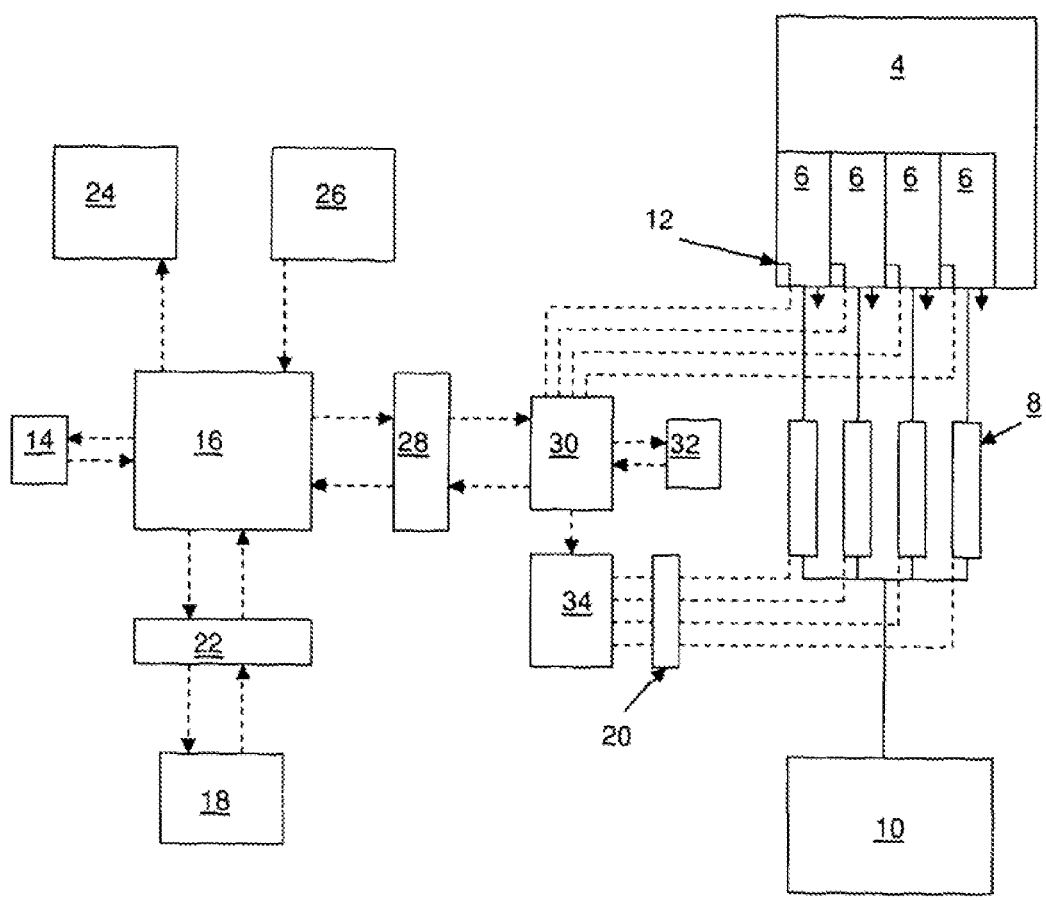
FIG. 2 shows a schematic of a second embodiment of the invention
Figure 3:
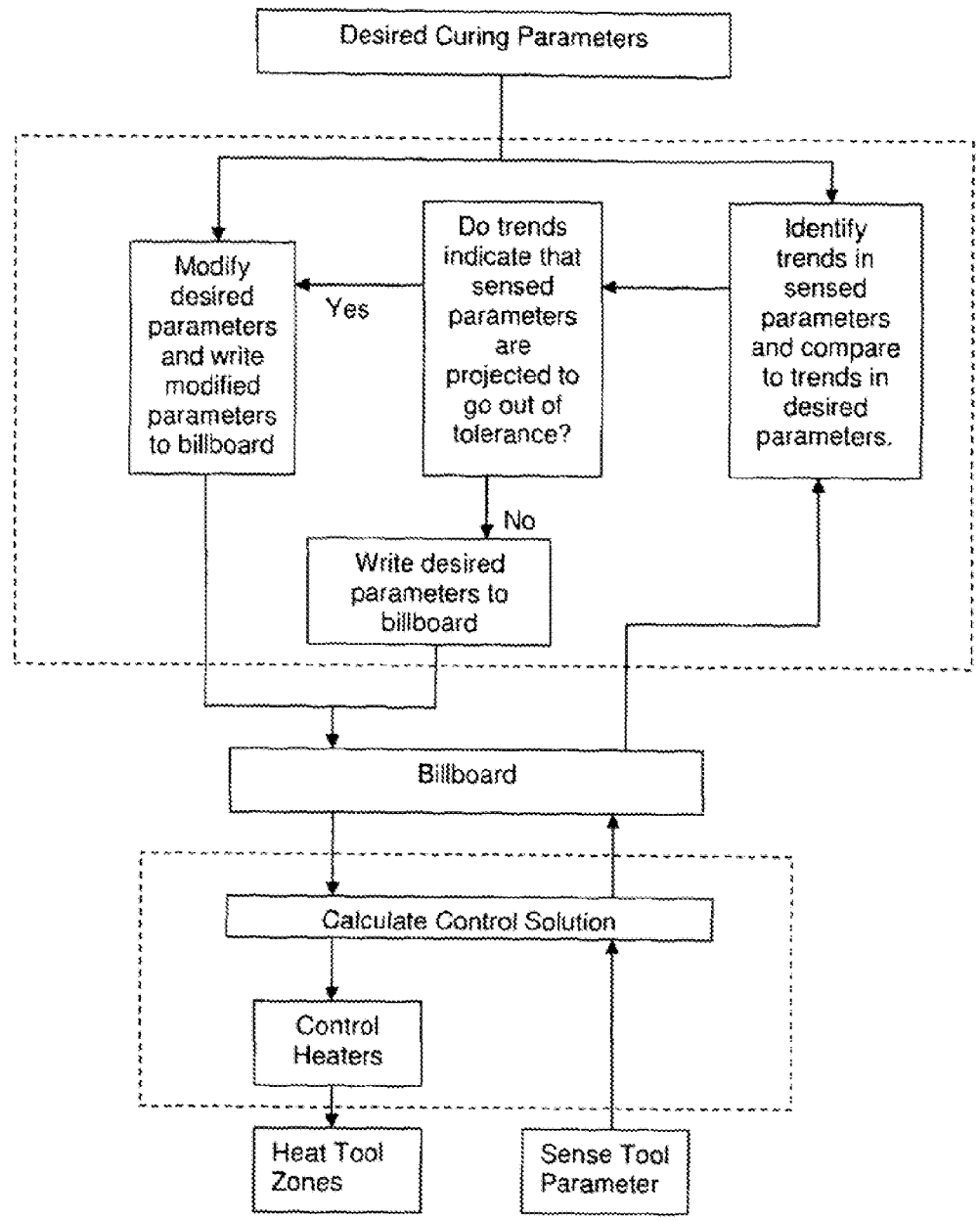
FIG. 3 shows a flow chart of a method of the first embodiment invention.
Figure 4:
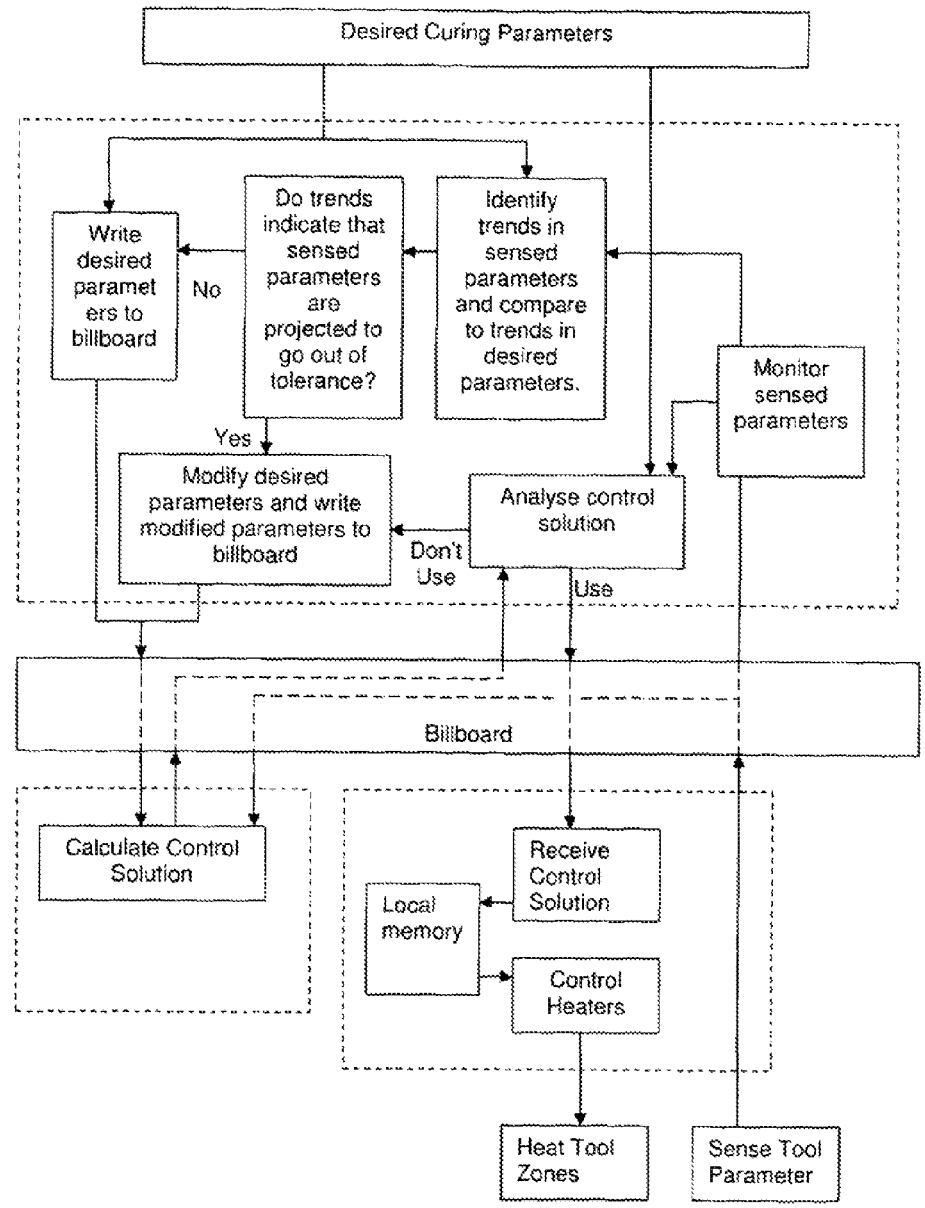
FIG. 4 shows a flow chart of the method of the second embodiment of the invention.
Figure 5:
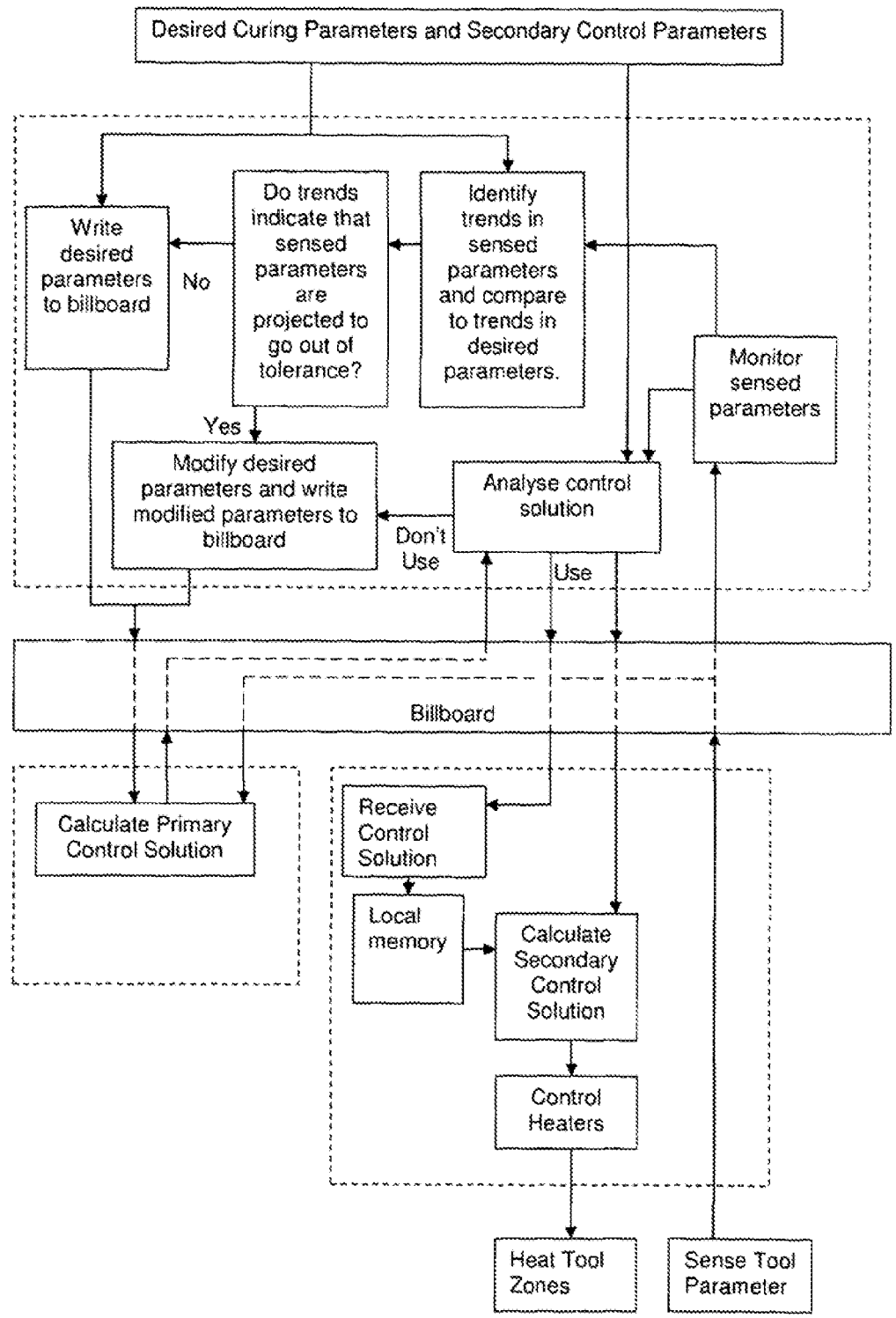
FIG. 5 shows a further method of the second embodiment of the invention.

Referring to FIGS. 1 and 2 a tool system 2 is shown having a tool 4 which has associated therewith a plurality of tool zones 6. Each tool zone is a heat controllable area of the tool surface. The tool zones are heated by the passage of hot air therethrough which originates from a source of compressed air 10 which may be any form of compressed air but ideally comprises a compressor and a pressurized air buffer vessel. Air from the source of compressed air 10 is passed through a plurality of heaters 8 one of which is associated with each tool zone. The heaters 8 can be turned on or off to heat the air passing therethrough and therefore transfer heat into each of the tool zones 6. The air exiting the tool zone 6 is vented to atmosphere but, as would be apparent to the skilled person, could be recycled or could have waste heat recovered therefrom.

Passage of the compressed air with the heaters 8 turned off will have a cooling effect on the tool surface.

Each tool zone 6 has a sensor 12 that monitors the temperature of the individual tool zone. Although not depicted in the schematic illustration, the temperature sensors 12 are placed as closed as is possible to the tool surface so as to provide an accurate representation of the heat passing from each tool zone into a work piece that is placed in the tool 4.

The tool is controlled by a control system primarily consisting of a memory 14, a main processor 16, and a controller 18.

Due to the speed at which heat can be put into, and taken out of, the tool zones, it is possible to get a very accurate control of the heat input to a work piece in the tool throughout the molding cycle. Furthermore, it is also possible to vary the temperature of different zones within the tool at different points through the tooling cycle.

The memory 14 of the control system stores data relating to desired curing parameters for a particular work piece. These desired curing parameters may, for example, include time and temperature set points throughout a moulding process for each tool zone, may include ramp rates between different temperatures or tool zone, and may include tolerance bands, both for the temperature at a given time for a individual tool zone and also tolerances on the temperate differentials between the tool zones, which may vary over time during the moulding cycle. By enabling the individual zones of the tool to be temperature controlled over time it can be ensured that the moulded work piece has mechanical or chemical properties of a designed and intended nature, for example the crystalinity of the material at different parts within the work piece can be produced to different desired levels. This enables the repeatable production of a work piece to a specification and enables components to be more precisely engineered and obviates the need to over engineer moulded components to allow for variation in the mechanical or physical properties of the finished work piece which often result due to variation in the various parameters (e.g. curing temperature) during the curing cycle. In other words, by accurately controlling the temperature of the work piece during the moulding cycle a moulded part can be produced to a desired, and more importantly a known, functional specification.

Furthermore, the direct application of heating and cooling into these individually controllable zones enables, for example, particular areas of a work piece to be crash cooled so as to effectively freeze the material in that zone to be largely amorphous, so as to prevent further cross linking of polymers, whereas other zones within the tool can be heated for a longer period of time so as to enable greater cross-linking of molecules in those regions. In this manner it is possible, for example, to produce components which display different properties in different areas. For example, a turbine blade may be required to have a high degree of crystalinity to give it rigidity towards the centre and rear of the blade whereas the leading edge of the blade may be required to have an area of greater amorphisity such that it is better able to absorb impact without cracking or shattering.

The main processor 16, which may, for example, be a computer running on a WINTEL platform, reads data from the memory 14 and outputs signals to the controller 18 representative of desired curing parameters, for example tool zone temperatures.

The controller 18 receives signals from the sensors 12 indicative of the tool zone temperatures and performs a control loop for each of these tool zones to determine the required control of the heaters 8 so as to provide hot or cold air flowing into the tool zones to bring them to the required temperature.

The controller 18 sends signals from the sensors 12 back to the main processor 16 which can monitor the temperatures of the tool zones and compare them to the required curing parameters stored in the memory 14.

The controller 18 could, for example, be a PID controller.

The controller 18 outputs signals to a relay array 20 which switches the main power to the heaters 8.

As the main processor 16 and the controller 18 are most likely to operate on different software platforms, for example the main processor 16 may run on WINTEL and the controller 18 may run on LINUX, they cannot easily communicate directly with one another.

Accordingly, the system also comprises an electronic billboard to which both the main processor and the controller can read and write information in a format that may be commonly identified by both software platforms.

The sequence of control is therefore that the controller 18 reads the desired curing parameters from the memory 14 and posts the desired curing parameters for each tool zone on the billboard 22. The controller 18 reads the signals from the billboard 22, and also reads signals from the sensors 12 and performs a control algorithm (e.g. PID or other) on the signals to provide a control solution to the plurality of heaters 8. The controller 18 outputs signals to the relay array 20 which switches the main power to the heaters so as to perform the control solution.

The controller 18 also posts the signals 12 to the billboard 22 so that the main processor 16 can read the temperature of the individual tool zones.

The controller 18 monitors the signals from the sensors 12 to identify any trends in the data. For example, the data may show that the signals coning from the sensors 12 indicate that all tool zones are currently performing to specification and are within the tolerance bands for their desired temperatures as stored in the memory 14. However, even though the data may be within tolerances the main processor 16 may identify a trend in the data that indicates that it is likely to move out of its tolerance. There could be any number of reasons for such an event occurring, a common one being that the thermosetting of polymer resins is an exothermic process so that, not only is heat put into the work piece from the tool zones 6, but also heat may be generated internally within the work piece. As it is not always possible to determine exactly when this internal heating will occur due to a number of process variables, for example the initial starting temperature of the resin in the mould and the exact chemical composition of the resin, which, as is well known, can vary froth batch to batch of resin, is not possible to accurately include the internal heating effect of exothermic polymer reactions into a fully predetermined control algorithm.

Accordingly, the ability for the main processor 16 to identify not only the instantaneous compliance of the tool zones with the desired curing parameters, but to also identify trends in that data and whether or not the identified trends are in alignment with projected trends in the desired curing parameters or whether they indicate that the instantaneous measurements will move outside of the required tolerance of the desired curing parameters, enables a far greater control of the overall process.

If the main processor 16 identifies that the trends in the data received from the sensors 12 indicate that the temperature of the tooling zones is moving, or is predicted to move, out of its desired tolerance bands then the main processor 16 intervenes and modifies the data read from the memory 14 before posting it on the billboard 22. For example, if the data comprises a time and temperature set point and the measured parameters indicate that the temperature of the tool surface is rising too quickly, then the main processor 16 could intervene so as to lower the target temperature or to push back the desired time for that temperature so as to reduce the ramp rate from the current time and temperature going forwards. This would result in the temperature input into the tool zone to be reduced and to allow the trend of the tool zone to normalize back to the desired trend from the projected desired curing parameters within the memory 14.

The control system also comprises a display 24 that can display data gathered from the tool system. The data may, for example, show a 3D image of the tool surface identifying the individual tool zones and may show the temperature for each of the tool zones and the target temperatures for each of those tool zones. Furthermore, the display may highlight tool zones whose trends show that they will be soon going out of the specification.

The controller 18 also includes a input device 26 which may be a user interface, for example a keypad, or may be an electronic input device, for example to enable the loading of desired curing parameters for a particular tooling process from an electromagnetic, solid state, or optical storage means. The interface 26 may also, for example, be a serial or other type of electronic port so that the main processor 16 can be linked to an electric or electronic programming means to transfer the desired curing parameters for a moulding process into the memory 14. The controller 18, memory means 14, display 24 and input means 16 may together comprise a computer, and the controller 18 may be a multichannel programmable logic controller (PLC).

Referring now to FIGS. 2 to 5 another embodiment of the invention is shown that is similar in many regards to the embodiment shown in FIG. 1. The tooling system has a tool 4 with a plurality of tool zones 6, each of which has a sensor 12 associated therewith. The tool zones 6 are heated and cooled in the same manner as in the embodiment shown in FIG. 1, namely compressed air from compressed air source 10 is passed through inline heaters 8 which can be powered to provide a hot air flow to the tool zones 6, or alternatively can remain unpowered so as to allow a cool air flow to the tool zones 6.

The control apparatus has a main processor 16 that reads stored desired curing parameters from memory means 14. The desired curing parameters can be inputted into the memory means, via the main processor, by input means 26. A visual display 24 is connected to the main processor to visually display data representative of the temperatures associated with each tooling zone 6 and/or any other data which is known for the system.

The main processor 16 communicates with a controller 18 via an electronic billboard 22 which enables the main processor 16 and controller 18 to communicate information with one another even though they may operate on different operating platforms. The main processor 16 reads the required curing parameters from the memory 14 and writes them onto the billboard 22. The controller 18 reads the curing parameters from the electronic billboard 22 and performs a control function to calculate an output control for controlling the heaters 8 to achieve the desired curing parameters.

In this embodiment the controller 18 writes the control solution back to the electronic billboard 22. The main processor 16 then reads the control solution from the electronic billboard 22 and analyses it.

If the main processor 16 decides that it wishes to use the control solution that the controller has calculated it then writes this to a second electronic billboard 28. A dedicated processor 30 reads the control solution from billboard 28 and stores it temporarily in its memory 32. The dedicated processor 30 then controls the heaters 8 via a relay array 20 in accordance with the control solutions.

The dedicated processor 30 receives signals from the sensors 12 which are then posted on billboard 28 so that they can be read by the main processor 16 and thereafter passed on to the controller 18. In one optional arrangement, not shown, billboards 22 and 28 could be a common billboard and the controller 18 and the main processor 16 may both read the sensor signals directly from the billboard.

The main processor 16 operates in a similar manner as described in reference to FIG. 1 in that it identifies trends in the signals received from the sensors 12 and, if it calculates that the trends indicate that the temperatures of the tool zones are going to move out of their tolerances then the controller 18 can adapt the desired curing parameters and post the modified curing parameters on billboard 22 so that the controller 18 calculates the control solution based on the modified curing parameters so as to prevent the tool zones 6 from moving outside of their desired tolerances.

In this embodiment controller 8 also performs an additional function in that it can review the control solution and decide whether or not to post the control system to billboard 28. For example, if the main processor 16 identifies that there is no or very little change in the control solution than those previously sent to the dedicated processor 30 via billboard 28, and therefore stored in the dedicated processor memory 32, the main processor 16 may decide not to post that control solution. Furthermore, if the main processor 6 identifies that there are changes in only one or two of the tool zones in the new control solution compared to the previous control solution, the main processor 16 may chose only to post updated solutions for those particular tool zones. Such functionality on the part of the main processor 16 may cut down the number of postings and readings to and from the billboards and make the flow of information through the control system more efficient.

Another benefit of the control solution from the controller 18 passing through the main processor 16 prior to being used to control the heaters 8 is that the main processor 16, or dedicated processor 30 can intervene to modify the control solution based on secondary parameters.

The desired curing parameters stored in the memory 14 form the highest level of control for the tooling system and ensure that the work piece is produced to the desired specification. However, there may be a number of curing parameter solutions that would achieve the same desired and repeatable functional specification of the work piece and the memory means 14 may include a member of these different solutions for the desired curing parameters. The main processor 16 may also contain data relating to secondary control parameters which may, for example, include desired length of moulding cycle, a required time efficiency, a required energy efficiency or a required particular heater usage. The main processor 16 can then intervene in the control solution, either by modifying the set points posted on the billboard 22, or by choosing to accept or reject a control solution provided by the controller i.e. the main processor 16 may receive a control solution from the controller 18 via billboard 22 but may identify that it includes parameters that it dislikes. For example, the main processor 16 may also monitor the current usage of the heaters 8 and, if the main processor 16 identifies a trend in the increased power consumption of a particular heater then it may be indicative that that particular heater is experiencing a fault, or nearing the end of its life, and the controller 18 may decide to minimise the use of that heater in the control. The main processor may therefore further modify the desired curing parameters and repost them on billboard 22 such that the controller 18 can recalculate a different control solution. In the example given this may, for example, mean that if one of the heaters 8 is required only to have minimum usage that the heaters heating the tool zones to either side of the tool zone being heated by the heater which is experiencing problems input greater heat into those tool zones so as to pull up the temperature of the tool zone experiencing less direct heat.

The main processor 16 may also, as stated, include information such as desired heater efficiencies and may post these to the dedicated processor 30 via billboard 28. A further component, a field programmable gate array 34 may be located between the dedicated processor 30 and the heaters 8 and may perform a number of different functions for example the field programmable gate array (FPGA) 34 may time slice or sequence the use of the heaters so as to control overall power requirements (FIG. 5) or may control a mixture of airflow and heater usage to balance the heating and cooling requirements with a need not to create large out of balance power draws on different phases of electric supply supplying different heaters.

For example, where a large number of heaters are being used the system may not be able to supply power to all of the heaters simultaneously as the total power draw may exceed the rating of the power supply and, accordingly, it may be necessary to pulse the heaters in sequence giving a higher instantaneous amount of power to each heater but, by sequencing the pulsing of heaters, ensuring that the maximum power draw on the power supply to the heaters does not exceed a specific value. As discussed previously, based on the desired power optimization or efficiency optimization the processor 16 may send signals to the FPGA 34 to control the speed and timing of the pulsed heater operation. The controller 18 may vary these to optimize system performance based on the number of tool zones 6 to which heat is being supplied at any given time.

While described herein in reference to air it will be appreciated that the apparatus and method of the invention could use any fluid medium that is capable of transferring heat, for example a liquid like oil could equally be used.

The invention claimed is:

1. A method of moulding a work piece to a functional specification, the method comprising:
   providing a mould tool comprising:
      a mould surface divided into a plurality of individual temperature-controlled tool zones;
      a fluid conduit configured to selectively provide a flow of compressed fluid to each tool zone:
      a valve configured to control the flow of compressed fluid through each fluid conduit; and
      a heater associated with each tool zone, each heather being configured to heat the compressed fluid provided to the associated tool zone;
   storing desired curing parameters for the work piece on a memory;
   placing mould material in the mould tool;
   sensing at least one property of the work piece or tool surface at each tool zone;
   monitoring signals from the sensors to monitor the sensed properties:
   comparing the sensed properties to the desired curing parameters;
   based on the compared sensed properties, calculating a control solution to control a supply of thermal energy to and from each individual tool zone to meet the desired curing parameters;
   controlling the thermal energy to and from each tool zone in accordance with the control solution by selectively controlling the valve and the heater.

2. The method according to claim 1, wherein the desired curing parameters include at least one of time and set point information and a tolerance for one or more of tool temperature, work piece temperature, dielectric constant and targets, ramp rates and tolerances for the ramp rates for one or more of tool temperature, work piece temperature or dielectric constant, for each individual tool zone.

3. The method according to claim 1, wherein the desired curing parameters include time related differentials for at least one of tool temperature, work piece temperature or dielectric constant, between adjacent tool zones.

4. The method according, to claim 1, wherein the steps of: monitoring the signals from the sensors and comparing the monitored properties to the desired curing parameters are performed by a main processor and wherein a. controller is used to calculate the control solution, the method further including:
   the controller and the main processor reading information from and writing information to an electronic billboard to communicate with one another such that the electronic billboard acts as an information bridge between the controller and the main processor.

5. The method according to claim 4, further comprising the steps of
   the controller writing the control solution to the electronic billboard and the main processor comparing the control solution to predetermined criteria and, depending on the comparison, accepting or ignoring the control solution.

6. The method according to claim 4, further comprising: writing the control solution from the main processor to a dedicated processor and temporarily storing the control solution on a second memory.

7. The method according to claim 6, further comprising the main processor also sending information of other desired operational parameters to the dedicated processor and the dedicated processor switching the heaters on and off based on the control solution and the operational parameters.

8. The method according to claim 7, wherein the operational parameters include at least one of: power requirement, of each heater, switching time of each heater, sequencing of each heater and the phase of a multi-phase electric supply that is associated with each heater.

9. The method according to claim 6, further comprising at least one of the controller and the dedicated processor electronically confirming its communication with one another on a periodic basis.

10. The method of claim 9, wherein, if the main processor and the controller are unable to electronically confirm a presence of each other, the method further comprises the controller controlling the mould tool according to data defining desired time and temperature set points for the moulding process and, if the main processor and the controller are unable to electronically confirm their communication with one another for a predetermined time period, the method further comprises initiating a fault sequence in which all tool zones are cooled.

11. The method of claim 1, further comprising:
   identifying, trends in the monitored properties; and
   if the identified trends indicate that the monitored property of a tool zone will move out of a tolerance band of the desired curing parameters, modifying the desired curing parameters read from the memory and calculating a further control solution to obtain the modified curing parameters so as to maintain the monitored property within the desired tolerance band of the desired curing parameters.

12. The method of claim 1, wherein controlling the thermal energy to and from each tool zone comprises effectuating a heating mode in which compressed air is passed through the fluid conduit with the heater turned on, and a cooling mode in which compressed air is passed through the fluid conduit with the heater turned off.

13. The method of claim 1, further comprising pulsing the heaters to ensure that a maximum total power draw of electrical power does not exceed a predetermined level.

14. The method of claim 1, further comprising:
   providing a display;
   displaying data relating to each of the individual temperature controlled tool zones on the display.

15. The method of claim 14, wherein the data comprises a temperature of each tool zone and a target temperature of each tool zone.

\* \* \* \* \*